Jan. 31, 1961   R. M. SMITH   2,970,312
BROAD BAND CIRCULARLY POLARIZED C-BAND ANTENNA
Filed Sept. 21, 1959
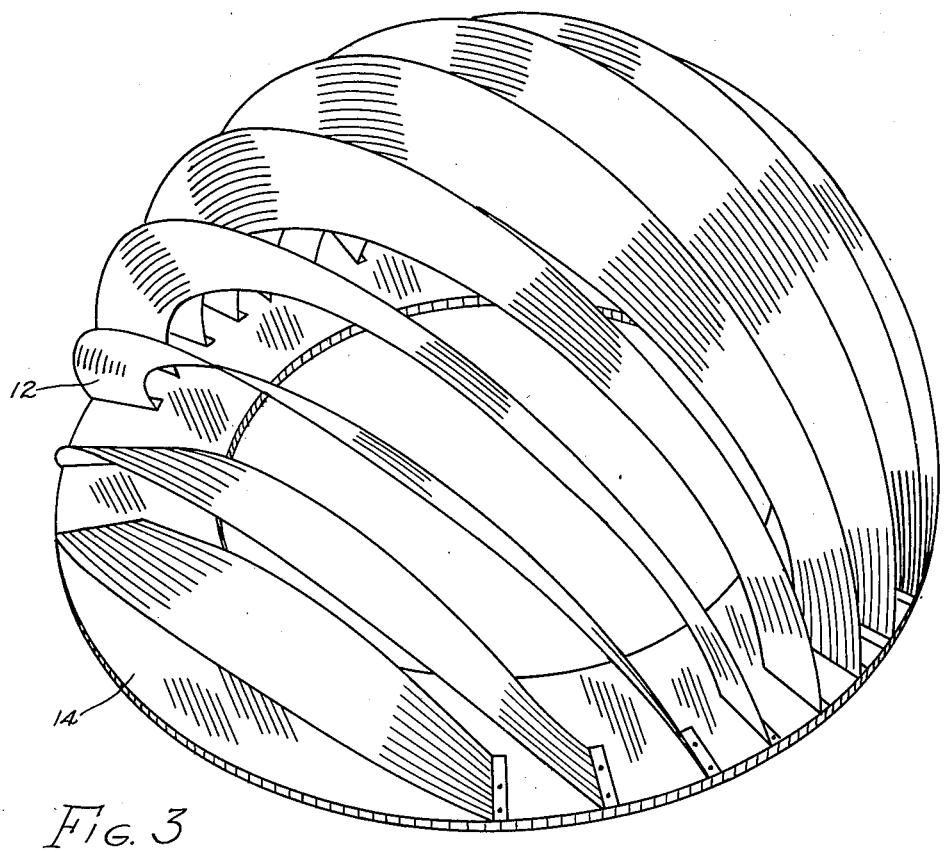
Fig. 3
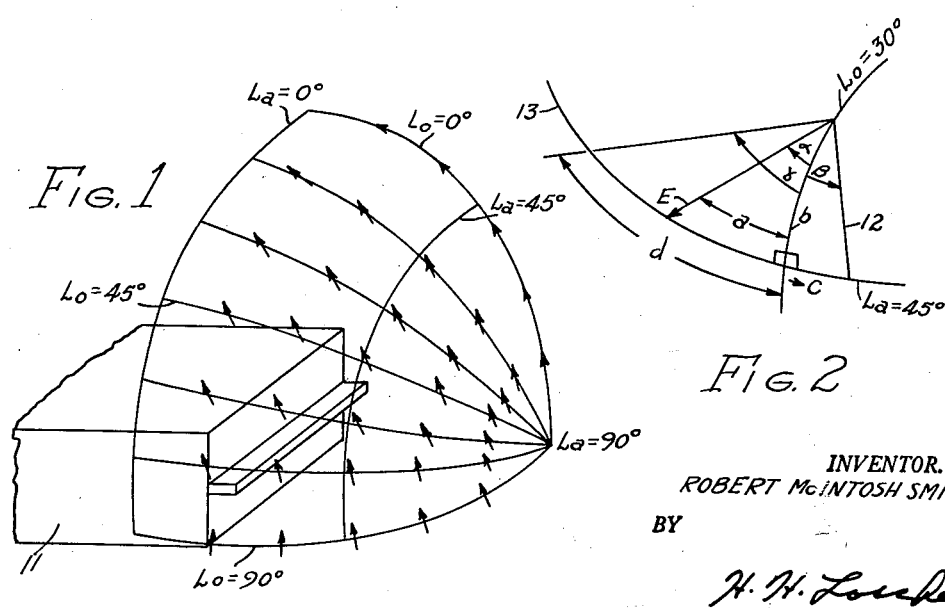
Fig. 1
Fig. 2
INVENTOR.
ROBERT McINTOSH SMITH
BY
*H. H. Loucke*
ATTORNEYS

2,970,312
BROAD BAND CIRCULARLY POLARIZED C-BAND ANTENNA

Robert M. Smith, Moorestown, N.J., assignor, by mesne assignments, to the United States of America as represented by the Secretary of the Navy Filed Sept. 21, 1959, Ser. No. 841,423

3 Claims. (Cl. 343—756)

The present invention relates to apparatus and means for propagating electromagnetic wave energy, and more particularly to a circularly polarized feed for a radar antenna.

Circular polarization of radar antennas have been employed in the past in order to reduce the susceptibility of the radar equipment to intentional jamming. However, because of the loss of signal return from the desired target, the use of polarization has been somewhat limited.

Recently new needs for circular polarization have developed. One of these is in the detection and tracking of satellites or other targets at very high altitudes such that propagation of the radar signal through the ionosphere is required. If a linearly polarized signal is used in certain frequency ranges there is a Faraday rotation of the field as it passes through the ionosphere. Since the magnitude of the rotation is variable and unpredictable, a linearly polarized wave may come back cross polarized, to the radar antenna, resulting in inability to detect the target or loss of a target already acquired. A circularly polarized wave, although rotated at a different rate by the Faraday effect, remains circularly polarized assuring no loss of the target due to this effect.

Another need for circular polarization is to make a radar antenna capable of radiating a wave which can trigger a linearly polarized beacon of random orientation. The radar antenna must be capable of receiving signals from such a beacon. The antenna is used primarily in a precision tracking radar system of the monopulse type operating in the C-band.

In the present invention, a polarizing grating is mounted between the feed and the reflector of the antenna. As the antenna has a relatively small depth to diameter ratio, a wide angle primary pattern is required from the feed horn and accordingly the grating must be distorted into a spherical shape to fit the phase front. The grating is also designed so that the metal plates are always at 45 degrees to the electric field of the linearly polarized wave. Also, the grating segments are constructed in such a manner that they are at all points normal to the surface of the spherical wave.

It is a general object of the present invention to provide a simple means for emitting and receiving circularly polarized radiation.

Another object of the present invention is to provide a hemispherical grating consisting of concentric metal fins capable of transforming linear polarization from an antenna feed horn to circular polarization.

Other objects and advantages of the present invention will be readily appreciated as the same becomes better understood by reference to the following detailed description when considered in connection with the accompanying drawings wherein:

Figure 1 is a diagrammatic view showing an E-field orientation on a spherical surface;

Figure 2 is a diagrammatic view showing a segment of a spherical surface; and

Figure 3 is a perspective view showing an embodiment of a polarizer.

Referring now to the drawing, there is shown in Figure 1, several examples of the E vector orientation on a spherical surface around the feed 11. In order to analytically determine the equations for the plates of the grating, it is necessary first to determine the general equation for lines on the surface of the sphere which are at 45 degrees to the electric field vector.

Referring to Figure 2 of the drawings, wherein $L_o$ represents a longitudinal line on a spherical surface and $L_a$ a latitudinal line, it can be seen that where $$\alpha = L_o = 30°$$
$$\beta + \alpha = 45°$$

and $$\gamma + \beta = 90°$$

then (1) $$a = -\Delta L_o \cos L_a$$
(2) $$b = -\Delta L_a$$

and therefore (3) $$\tan L_o = \frac{\Delta L_o \cos L_a}{\Delta L_a}$$

In order to determine the general equation of lines which cross the E vector at 45°, it follows that:

(4) $$\beta = 45° - \alpha = \frac{\pi}{4} - L_o$$

(5) $$\tan\left(\frac{\pi}{4} - L_o\right) = \frac{c}{b}$$

and as $$b = -\Delta L_a$$

and $$c = \Delta L_o \cos L_a$$

then:

(6) $$\tan\left(\frac{\pi}{4} - L_o\right) = \frac{\Delta L_o \cos L_a}{\Delta L_a}$$

Equation 6 defines the slope of the required lines which can represent the outer edge of the metallic fins 12 of the grating. A general equation for the curves representing the metallic fins can be obtained by writing Equation 6 in differential form, separating the variables and integrating, which provides:

(7) $$\ln \tan \frac{\pi}{4} + \frac{L_a}{2} = \ln \sin\left(\frac{\pi}{4} - L_o\right) + \ln K_g$$

(8) $$\tan\left(\frac{\pi}{4} + \frac{L_a}{2}\right) = K_g \sin\left(\frac{\pi}{4} - L_o\right)$$

and (9) $$K_g = \frac{\tan\left(\frac{\pi}{4} + \frac{L_a}{2}\right)}{\sin\left(\frac{\pi}{4} - L_o\right)}$$

The constant $K_g$ can be determined by choosing a known $L_a$ and $L_o$, and substituting in Equation 9. It is now possible to determine the equations of the lines on the outer surface of the grating representing the metallic fins 12. As the plate spacing on the inside of the grating should be greater than a half wave length, the grid spacing of the metallic fins 12 on the outside surface was chosen to be 15° in latitude along the 45° longitudinal line.

Equation 8 can be transformed into a form that can be recognized as a circle. This circle can be used as the base of a cone with the vertex at the center of the sphere. Using a section of the surface of the cone, a segment can be constructed that will always intersect the electric field at 45 degrees and will be normal to the phase front of the wave, thus presenting minimum obstructing area to the wave.

The relative phase shift of the components parallel and perpendicular to the plates in passing through the grating segments is a function of the distance between them and their depth. Since the spacing varies over the surface, the depth must also be varied to give the required phase shift over the entire hemisphere. In order to determine the perpendicular spacing between the segments, it is necessary to establish a set of curves which are normal to the edge of the segments. To do this, the general equation of curve 13 must be determined, and referring to Figure 2 of the drawing, it can be seen that:

(10) $$\gamma = 45° - \alpha = \frac{\pi}{4} + L_o$$

and therefore,

(11) $$\tan \gamma = \tan \left(\frac{\pi}{4} + L_o\right) = \frac{d}{b}$$

and as $$b = \Delta L_a$$

and $$d = \Delta L_o \cos L_a$$

then

(12) $$\tan \left(\frac{\pi}{4} + L_o\right) = \frac{\Delta L_o \cos L_a}{\Delta L_a}$$

Upon separating the variables and solving the differential equation, the following general equation results:

(13) $$\ln \tan \left(\frac{\pi}{4} + \frac{L_a}{2}\right) = \ln \sin \left(\frac{\pi}{4} + L_o\right) + \ln K_0$$

and

(14) $$K_0 = \frac{\tan \left(\frac{\pi}{4} + \frac{L_a}{2}\right)}{\sin \left(\frac{\pi}{4} + L_o\right)}$$

By using Equations 9 and 14, the points of intersection of the metal fins 12 and the various latitudinal lines can be determined, and then the perpendicular spacing between the segments can be calculated by using spherical trigonometry.

Having provided a means of calculating the spacing between the metal plates at all points on the outer surface, the depth of the metallic fins must then be determined. As can be seen in Figure 3 of the drawing, the spacing between metallic fins 12 varies from a maximum at the midpoint of the individual segments and decreases as the fins approach the mounting flange 14. This variation in spacing makes necessary a variation in depth of the grating to give a constant phase shift differential over the entire surface. Thus the inside surface of the grating is not a sphere, as is the outside. In order to determine the contour of the inside surface, the required depth of the plates can be determined at a multiple number of points and the contour constructed from these points. The depth of the fins 12 must be such that the electrical depth of the grating to components of the incident wave, whose E vectors are parallel and perpendicular to the fins 12, is 90 degrees. The wave length of components with the E vector perpendicular to the fins is the same as the free space wave length. The wave length of the components with the E vector parallel to the plates varies continuously from the inside to the outside of the grating because the plates diverge.

Several polarizer units have been constructed according to the principles outlined herein and upon testing have proven to be highly successful. The test results showed a negligible change in the main beam and only a slight deterioration in sidelobe level. One unit was constructed such that the outer surface of the grating had a radius of 7 inches. The contour of the metal fins 12 was such that they were sections of concentric cones. Another unit was constructed having a grating with a radius of 8 inches. The contour of the metal fins 12 was such that they were made to the surface of cones with the same vertex.

It can be thus be seen that the present invention provides a relatively simple device for transforming linear polarization to circular polarization. Obviously many modifications and variations of the present invention are possible in the light of the above teachings. It is therefore to be understood that the invention may be practiced otherwise than as specifically described.

What is claimed is:

1. In a broad band circularly polarized antenna for propagating electromagnetic wave energy, a polarizing grid comprising: a ring-shaped mounting flange, a plurality of metallic fins attached to said mounting flange with the spacing between adjacent fins being variable with the maximum distance between adjacent fins being at the mid-point of said fins and the minimum distance between adjacent fins being at the mounting flange, said fins being oriented at 45 degrees to the electrical field of said antenna and normal to the phase front of said waves being propagated, the outer edges of said fins being positioned to form a hemispherical shell.

2. A polarizing grid as set forth in claim 1 wherein said metallic fins are sections of concentric cones.

3. A polarizing grid as set forth in claim 1 wherein said metallic fins are sections of cones with the same vertex.

References Cited in the file of this patent

UNITED STATES PATENTS

| 2,680,810 | Korman | June 8, 1954 |
| 2,745,100 | McCann | May 8, 1956 |

FOREIGN PATENTS

| 643,679 | Great Britain | Sept. 27, 1950 |